(12) United States Patent
Hobel

(10) Patent No.: US 8,011,460 B2
(45) Date of Patent: Sep. 6, 2011

(54) HYBRID DRIVE FOR A VEHICLE

(75) Inventor: Peter Hobel, Neuhausen (DE)

(73) Assignee: Dr. Ing h.c.F. Porsche Aktiengesellschaft (DE)

( * ) Notice: Subject to any disclaimer, the term of this patent is extended or adjusted under 35 U.S.C. 154(b) by 280 days.

(21) Appl. No.: 12/464,284

(22) Filed: May 12, 2009

(65) Prior Publication Data

US 2010/0065353 A1 Mar. 18, 2010

(30) Foreign Application Priority Data

Sep. 16, 2008 (DE) .......................... 10 2008 047 288

(51) Int. Cl.
*B60K 6/42* (2007.10)
(52) U.S. Cl. ................................... 180/65.22
(58) Field of Classification Search ............... 180/65.21, 180/65.22, 65.25, 65.265; 903/909, 910, 903/911, 917, 919, 945, 951; 477/3, 5; 74/331, 74/661, 665 R
See application file for complete search history.

(56) References Cited

U.S. PATENT DOCUMENTS

| 7,367,416 B2 * | 5/2008 | Seufert et al. ............. 180/65.31 |
|---|---|---|
| 7,464,616 B2 | 12/2008 | Leibbrandt et al. |
| 2005/0079942 A1 * | 4/2005 | Bauknecht et al. ................ 475/5 |
| 2005/0101432 A1 * | 5/2005 | Pels et al. ........................... 477/5 |
| 2006/0060398 A1 * | 3/2006 | Bitsche et al. ............... 180/65.2 |
| 2007/0022835 A1 | 2/2007 | Kilian et al. |
| 2008/0000312 A1 | 1/2008 | Lang et al. |

FOREIGN PATENT DOCUMENTS

| DE | 102 50 853 | 5/2004 |
|---|---|---|
| DE | 10 2004 050 757 | 4/2006 |
| DE | 10 2006 028 582 | 2/2008 |

* cited by examiner

*Primary Examiner* — Ruth Ilan
*Assistant Examiner* — Robert A Coker
(74) *Attorney, Agent, or Firm* — Gerald E. Hespos; Michael J. Porco

(57) ABSTRACT

A hybrid drive (1) for a vehicle has an internal combustion engine (2), an electric machine (26) and a double clutch transmission (5) with a hollow first input shaft (9) and a second input shaft (11) that penetrates the first input shaft (9). A hollow transmission shaft (15) is parallel to the input shafts (9, 11), and a drive torque can be applied to the first or second input shafts (9, 11) via the internal combustion engine (2) and/or the electric machine (26) via the double clutch (5) of the double clutch transmission (10). The electric machine (26) is outside the double clutch transmission (10), and an output shaft (25) of the electric machine (26) penetrates the hollow transmission shaft (15). As a result, a compact configuration is ensured.

11 Claims, 2 Drawing Sheets

HYBRID DRIVE FOR A VEHICLE

This application claims priority under 35 USC 119 to German Patent Application No. 10 2008 047 288.3 filed on Sep. 16, 2008, the entire disclosure of which is incorporated herein by reference.

BACKGROUND OF THE INVENTION

1. Field of the Invention

The invention relates to a hybrid drive for a vehicle having an internal combustion engine, an electric machine and a double clutch transmission with a multiplicity of switchable gear speeds. The double clutch transmission has a hollow first input shaft and a second input shaft that penetrates the first input shaft. A transmission shaft is arranged parallel to the first and second input shafts. A drive torque can be applied to the first or second input shaft by the internal combustion engine and/or the electric machine via the double clutch of the double clutch transmission.

2. Description of the Related Art

A hybrid drive for a vehicle has an electric machine that can be used to feed torque into a transmission shaft and/or tap torque off from a transmission shaft by means of a generator mode. An electric machine also can be used to start the internal combustion engine in a cold or warm fashion.

The electric machine of known hybrid drives often is arranged spatially inside a double clutch transmission and takes up a relatively large amount of the installation space required by the internal combustion engine, the electric machine, the double clutch and the transmission. This installation space is not available in passenger cars that have the internal combustion engine in the rear region of the vehicle.

DE 10 2005 035 328 A1 discloses a version of the above-described hybrid drive and proposes a large number of different locations of action for the electric machine. Additionally, DE 10 2005 035 328 A1 suggests that the electric machine be used for a large number of modes of operation. More particularly, DE 10 2005 035 328 A1 discloses one embodiment where electric machine is disposed to act directly on the input side of the double clutch transmission. A further clutch is proposed to permit optional decoupling of the drive engine from the electric machine. This reference also proposes that the electric machine should act directly on the output shaft of the transmission or directly on a layshaft of the transmission.

Torques disadvantageously cannot be applied in the region of the point of separation of the internal combustion engine and the double clutch transmission when the electric machine is arranged outside the double clutch transmission.

EP 1 714 817 A1 discloses another hybrid drive for a vehicle having an internal combustion engine, an electric machine and a double clutch transmission.

An object of the invention is to develop a hybrid drive where a compact configuration of the double clutch transmission is ensured even if the torques of the electric machine are applied in the region of the point of separation of the internal combustion engine and double clutch transmission.

SUMMARY OF THE INVENTION

The invention relates to a hybrid drive for a vehicle having an internal combustion engine, an electric machine and a double clutch transmission with a multiplicity of switchable gear speeds. The electric machine is arranged outside the double clutch transmission. A hollow transmission shaft extends from the transmission and an output shaft of the electric machine penetrates the transmission shaft. The hybrid drive also has means for transmitting a rotational movement of the output shaft to the double clutch.

The electric machine of the invention is arranged outside the double clutch transmission. However, the output torque of the electric machine is applied inside the double clutch transmission via the double clutch. The electric machine therefore is arranged functionally where the separation occurs between the internal combustion engine and the transmission.

The transmission shaft preferably is an output shaft or layshaft of the double clutch transmission and functions to hold the output shaft of the electric machine. The output torque of the electric machine is transmitted by its output shaft to the double clutch.

The means for transmitting the rotational movement of the output shaft preferably is a gearwheel stage. More particularly, a first gearwheel preferably is connected in a rotationally fixed fashion to the output shaft, and a second gearwheel is connected in a rotationally fixed fashion to the double clutch. This gearwheel stage enables the torque of the output shaft of the electric machine to be passed to the double clutch in a structurally simple way. The gearwheel stage preferably is a spur gear stage to achieve a small installation space of the transmission in the region of this gearwheel stage. The double-clutch-side spur gear preferably is connected in a rotationally fixed fashion to the housing of the double clutch. This housing rotates with the rotational speed of the output shaft of the internal combustion engine unless a separating clutch is arranged between the internal combustion engine and the double clutch. This separating clutch may be used to drive the vehicle exclusively by electric motor when the internal combustion engine is decoupled.

The second gearwheel or the spur gear preferably engages a gearwheel or spur gear for driving a hydraulic pump of the double clutch transmission. This gearwheel set preferably has a design that already is provided to drive the hydraulic pump. Therefore all that is necessary is to provide the additional gearwheel that is connected to the output shaft of the electric machine and that meshes with the gearwheel set for driving the hydraulic pump. However, the gearwheel set that is provided for driving the hydraulic pump must be configured in accordance with the requirements of the drive by the electric machine.

The hybrid drive preferably is used in a vehicle that has an internal combustion engine and a double clutch transmission arranged in the rear region of the vehicle and the electric machine arranged upstream of the double clutch transmission. The structural separation of the electric machine from both the internal combustion engine and double clutch transmission eliminates the disposition of the electric machine unit between the internal combustion engine and double clutch transmission. Therefore, it is possible to reduce the overall length compared to a hybrid drive in which the electric machine is between the internal combustion engine and the transmission, and the electric machine is arranged in the region of the engine-transmission flange. Furthermore, a significantly improved distribution of weight is obtained in a vehicle driven by a rear-mounted engine by arranging the electric machine upstream of the double clutch transmission. However, the electric machine also could be arranged on the side of the double clutch transmission facing the internal combustion engine.

The electric machine preferably is in the rear region of the vehicle. However, it is possible to arrange the electric machine in the region of the front axle of the vehicle even though the internal combustion engine and the double clutch transmission are in the rear region of the vehicle. The connection between the electric machine and the double clutch transmission in this optional embodiment can be made, for example, by a cardan shaft. The output shaft preferably is underneath and transverse to a wheel drive shaft and is connected to the output of the double clutch transmission. This arrangement provides the possibility of moving the mounting of the electric machine to outside the double clutch transmission despite the limited space available for to the double clutch, axle drive, wheel set and hydraulic pump.

One preferred exemplary embodiment of the invention is explained in the drawing and will be described in more detail in the following description.

DETAILED DESCRIPTION OF THE PREFERRED EMBODIMENTS

Figure 1:
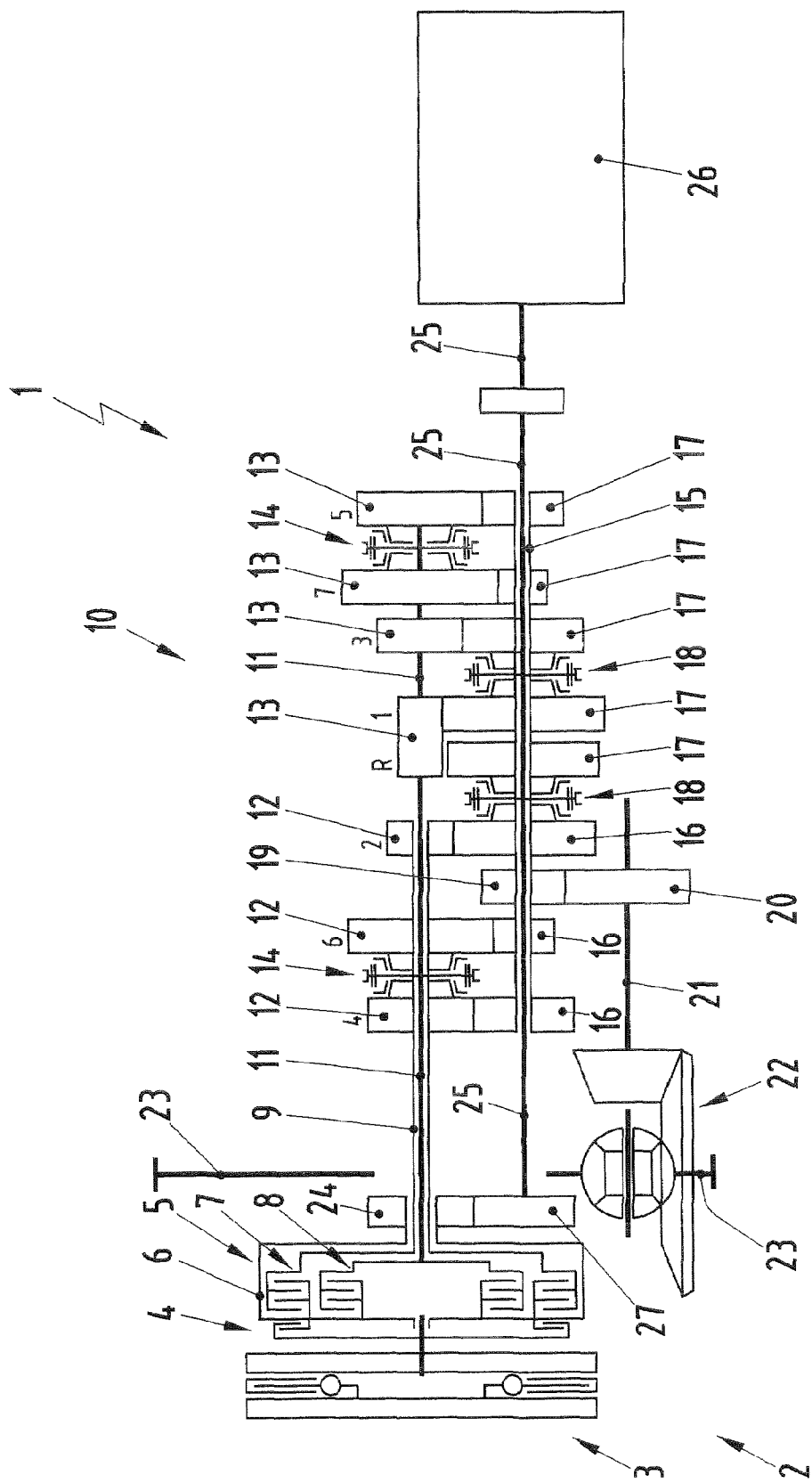
FIG. 1 is a schematic illustration of a first embodiment of the hybrid drive, in which the output shaft of the electric machine penetrates a power output shaft of the double clutch transmission.

A hybrid drive in accordance with an embodiment of the invention is identified by the numeral 1 in FIG. 1. The hybrid drive 1 includes an internal combustion engine 2. A two-mass flywheel 3 is used for the power output of the internal combustion engine 2 of the hybrid drive 1 and can be connected via a separating clutch 4 to a double clutch 5 in the region of a housing 6 of the double clutch 5. The double clutch 5 includes first and second clutches 7 and 8. Depending on the way in which the double clutch 5 is connected, the housing 6 of the double clutch 5 can be connected in a frictionally locking fashion to the first clutch 7 or to the second clutch 8 of the double clutch 5. The first clutch 7 of the double clutch 5 is connected in a rotationally fixed fashion to a first input shaft 9 of a double clutch transmission 10. The second clutch 8 of the double clutch 5 is connected in a rotationally fixed fashion to a second input shaft 11 of the double clutch transmission 10 that penetrates the first input shaft 9 coaxially and that is connected in a rotationally fixed fashion to a second input shaft 11. A first partial transmission with even-numbered forward gear speeds—gear speeds 2, 4 and 6—is assigned to the first input shaft 9, and a second partial transmission with uneven-numbered forward gear speeds—gear speeds 1, 3, 5 and 7—and the reverse gear speed is assigned to the second input shaft 11. The gearwheels that are connected to the first input shaft 9 are denoted by the reference numbers 12, and the gearwheels that are connected to the second input shaft 11 are denoted by the reference number 13. The above-mentioned gear speeds are denoted by small numbers 1 to 7 and a small upper case letter R. Synchronizing units 14 are provided for synchronizing gearwheels 12 and 13.

The power output shaft 15 of the double clutch transmission 10 is parallel to and spaced from the two input shafts 9 and 11. The gearwheels 16 that interact with the gearwheels 12 and the gearwheels 17 that interact with the gearwheels 13 are assigned to the power output shaft 15. Synchronizing units for synchronizing gearwheels 16 and 17 of the power output shaft 15 are denoted by the reference number 18.

A gearwheel 19 is connected to the power output shaft 15 and meshes with a gearwheel 20 that is connected to a shaft 21 by means of which a wheel drive shaft 23 can be driven by a differential 22 of the vehicle.

A spur gear 24 is connected to the housing 6 of the double clutch 5 on the side facing the gearwheel 12 and functions to drive a hydraulic pump of the double clutch transmission 10. The spur gear 24 interacts with a spur gear that is not illustrated and that is connected to the drive shaft of the hydraulic pump (likewise not illustrated). The two input shafts 9 and 11 penetrate the spur gear 24.

The power output shaft 15 is hollow and an output shaft 25 of an electric machine 26 that is arranged outside the double clutch transmission 10 penetrates the power output shaft 15 concentrically. The end of the output shaft 25 that faces away from the electric machine 26 is connected to a spur gear 27 that meshes with the spur gear 24.

The hybrid drive 1 is oriented so that the internal combustion engine 2 and the double clutch transmission 10 are arranged in the rear region of the passenger car, with the electric machine 26 being upstream of the double clutch transmission 10, if appropriate even in the region of the front axle of the vehicle.

The hybrid drive 1 therefore permits the electric machine 26 to be at a different location than the internal combustion engine 2 and the double clutch transmission 10. However, the extension of the output shaft 25 through the power output shaft 28 with respect to the spur gear 27 ensures that the electric machine 26, whose torque is applied to the double clutch 5 in the region of the double clutch 5, is functionally between the internal combustion engine 2 and the double clutch transmission 10.

Figure 2:
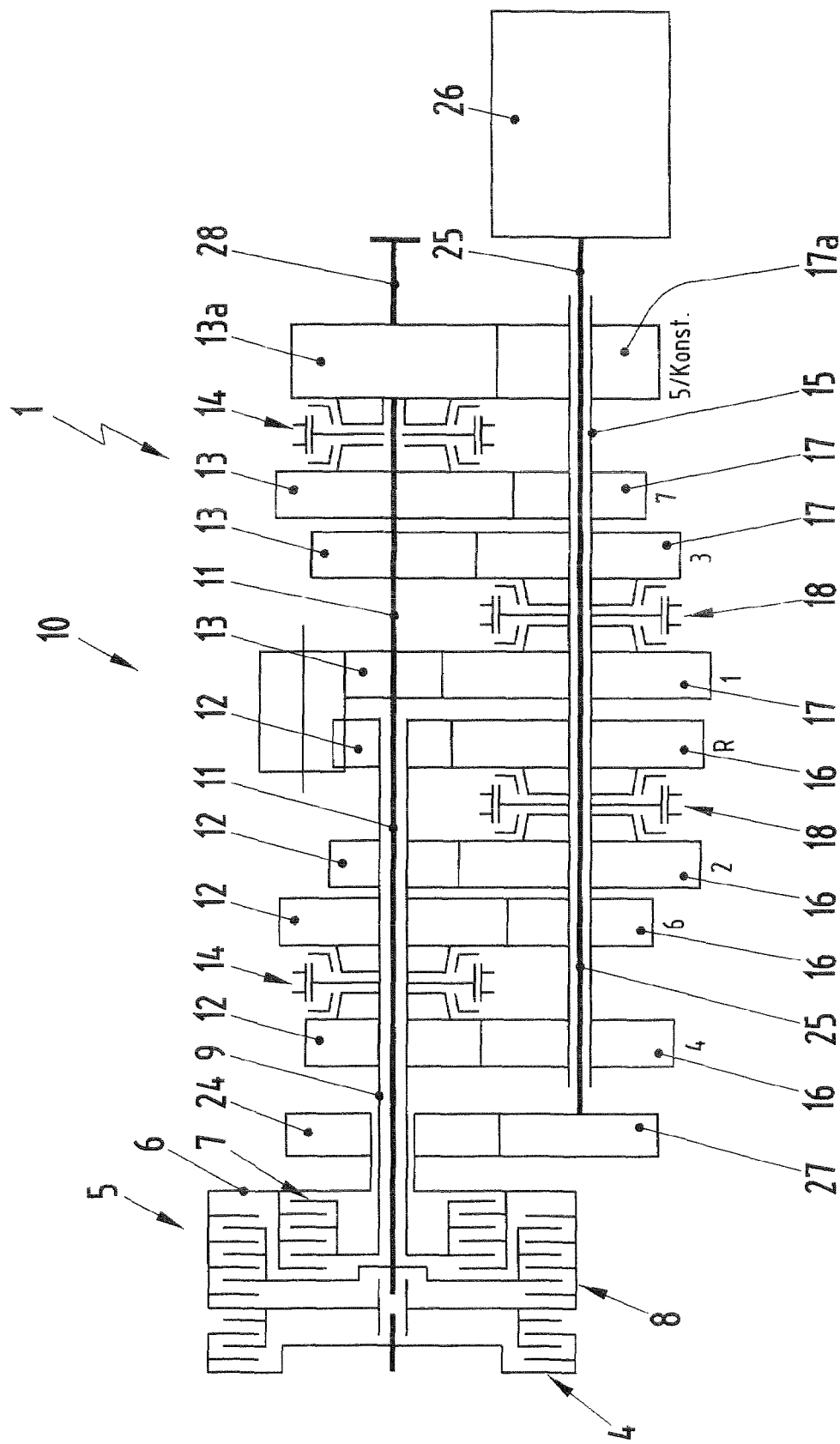
FIG. 2 is a schematic illustration of a first embodiment of the hybrid drive, in which the output shaft of the electric machine penetrates a layshaft of the double clutch transmission.

The embodiment of FIG. 2 differs from FIG. 1 only in that the shaft 15 has the function of a layshaft instead of the function of a power output shaft. In this case, the gearwheels 17*a* and 13*a* transmit to the power output shaft 28, to which the gearwheel 13*a* is connected, the torque that was applied via the gearwheels 12 and 13 into the gearwheels 16 and 17 and from there into the layshaft 15. In this variant, in the case of the fifth forward gear speed there is no interaction between a gearwheel 13 of the second input shaft 11 and a gearwheel of the layshaft 15, but instead the power output shaft 28 is driven directly by the second input shaft 11.

What is claimed is:

1. A hybrid drive for a vehicle having an internal combustion engine, an electric machine and a double clutch having plural switchable gear speeds, a double clutch transmission having a hollow first input shaft and a second input shaft that penetrates the first input shaft, and a hollow transmission shaft arranged parallel to the double clutch transmission so that a drive torque can be applied to the first input shaft or second input shaft by the internal combustion engine or the electric machine via the double clutch of the double clutch transmission, the electric machine being arranged outside the double clutch transmission, and an output shaft of the electric machine penetrating the hollow transmission shaft, and means for transmitting a rotational movement of the output shaft to the double clutch.

2. The hybrid drive of claim 1, wherein the transmission shaft is a power output shaft or layshaft of the double clutch transmission.

3. The hybrid drive of claim 1, wherein the means for transmitting the rotational movement of the output shaft define a gearwheel stage with a first gearwheel that is connected and rotationally fixed to the output shaft and a second gearwheel that is connected in a rotationally fixed fashion to the double clutch.

4. The hybrid drive of claim 3, wherein the gearwheel stage is a spur gear stage with a double-clutch-side spur gear connected and rotationally fixed to a housing of the double clutch.

5. The hybrid drive of claim 4, wherein the second gearwheel engages a gearwheel or spur gear for driving a hydraulic pump of the double clutch transmission.

6. The hybrid drive of claim 1, wherein the internal combustion engine and the double clutch transmission are arranged in a rear region of the vehicle and the electric machine is arranged upstream of the double clutch transmission.

7. The hybrid drive of claim 6, wherein the electric machine is arranged in the rear region of the vehicle or in a region of a front axle of the vehicle by means of a cardan shaft.

8. The hybrid drive of claim 1, wherein the output shaft is underneath and transverse to a wheel drive shaft and is connected to the output of the double clutch transmission.

9. The hybrid drive of claim 1, further comprising a clutch arranged between the internal combustion engine and the double clutch.

10. A hybrid drive for a vehicle having opposite front and rear ends, the hybrid drive comprising: an internal combustion engine and a double clutch in proximity to the rear end of the vehicle, the hybrid drive further comprising an electric machine, the double clutch having plural switchable gear speeds, a double clutch transmission having a hollow first input shaft and a second input shaft that penetrates the first input shaft, and a hollow transmission shaft arranged parallel to the double clutch transmission so that a drive torque can be applied to the first input shaft or second input shaft by the internal combustion engine or the electric machine via the double clutch of the double clutch transmission, the electric machine being arranged outside the double clutch transmission and at a position forward of the internal combustion engine and the double clutch for distributing weight forwardly on the vehicle and achieving efficient space utilization in proximity to the internal combustion engine, an output shaft of the electric machine penetrating the hollow transmission shaft, and means for transmitting a rotational movement of the output shaft to the double clutch.

11. The hybrid drive of claim 10, wherein the electric machine is arranged in a region of a front axle of the vehicle, and wherein the electric machine is connected to the double clutch transmission by a cardan shaft.

* * * * *